(12) United States Patent
Hero et al.

(10) Patent No.: US 7,653,264 B2
(45) Date of Patent: Jan. 26, 2010

(54) METHOD OF DETERMINING ALIGNMENT OF IMAGES IN HIGH DIMENSIONAL FEATURE SPACE

(75) Inventors: Alfred Hero, Ann Arbor, MI (US); Huzefa Neemuchwala, Mountain View, CA (US); Paul Carson, Ann Arbor, MI (US); Charles Raymond Meyer, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 488 days.

(21) Appl. No.: 11/276,537

(22) Filed: Mar. 3, 2006

(65) Prior Publication Data

US 2006/0257027 A1    Nov. 16, 2006

Related U.S. Application Data

(60) Provisional application No. 60/658,427, filed on Mar. 4, 2005.

(51) Int. Cl.
*G06K 9/32* (2006.01)
(52) U.S. Cl. ...................... 382/294; 345/619
(58) Field of Classification Search ................. 382/190, 382/100, 293, 294, 276; 345/619, 689
See application file for complete search history.

(56) References Cited

U.S. PATENT DOCUMENTS

| | | | |
|---|---|---|---|
| 4,590,607 A | 5/1986 | Kauth | |
| 4,635,293 A | 1/1987 | Watanabe | |
| 4,641,352 A | 2/1987 | Fenster et al. | |
| 4,685,146 A | 8/1987 | Fenster et al. | |
| 5,260,871 A | 11/1993 | Goldberg | |
| 5,359,513 A | 10/1994 | Kano et al. | |
| 5,531,520 A | 7/1996 | Grimson et al. | |

(Continued)

FOREIGN PATENT DOCUMENTS

WO          00/57361 A1     9/2000

(Continued)

OTHER PUBLICATIONS

Neemuchwala, Image registration using entropic graph-matching criteria, Nov. 2002, IEEE, vol. 1, 134-138.*

(Continued)

*Primary Examiner*—Anand Bhatnagar
(74) *Attorney, Agent, or Firm*—Howard & Howard Attorneys PLLC

(57) ABSTRACT

A method determines alignment of images in high dimensional feature space. The method comprises registering a source image of a reference modality to a target image of a second modality with an algorithm based upon a measure of information affinity present in both of the source and target image to create a registered image. Next, a plurality of feature vector are extracted from the registered image for each of the source and target images and attributes of the joint distribution of feature vector are captured using an entropic graph spanning the features. Edge lengths are between proximal feature vectors are extracted from the entropic graph and a similarity measure of one of an α-divergence estimate or an α-affinity estimate is constructed based upon these edge lengths to quantify whether the source and target image are sufficiently registered.

19 Claims, 11 Drawing Sheets

U.S. PATENT DOCUMENTS

| | | | |
|---|---|---|---|
| 5,581,638 | A | 12/1996 | Givens et al. |
| 5,590,261 | A | 12/1996 | Sclaroff et al. |
| 5,594,807 | A | 1/1997 | Liu |
| 5,610,993 | A | 3/1997 | Yamamoto |
| 5,611,000 | A | 3/1997 | Szeliski et al. |
| 5,633,951 | A | 5/1997 | Moshfeghi |
| 5,812,691 | A | 9/1998 | Udupa et al. |
| 5,839,440 | A | 11/1998 | Liou et al. |
| 5,850,486 | A | 12/1998 | Maas, III et al. |
| 5,937,083 | A | 8/1999 | Ostuni |
| 5,956,435 | A | 9/1999 | Buzug et al. |
| 5,974,165 | A | 10/1999 | Giger et al. |
| 5,999,840 | A | 12/1999 | Grimson et al. |
| 6,035,066 | A | 3/2000 | Michael |
| 6,061,467 | A | 5/2000 | Michael |
| 6,075,905 | A * | 6/2000 | Herman et al. .............. 382/284 |
| 6,195,659 | B1 | 2/2001 | Hyatt |
| 6,236,742 | B1 | 5/2001 | Handel |
| 6,249,595 | B1 | 6/2001 | Foxall et al. |
| 6,249,616 | B1 | 6/2001 | Hashimoto |
| 6,266,453 | B1 | 7/2001 | Hibbard et al. |
| 6,343,143 | B1 | 1/2002 | Guillemaud et al. |
| 6,373,998 | B2 | 4/2002 | Thirion et al. |
| 6,463,167 | B1 | 10/2002 | Feldman et al. |
| 6,463,168 | B1 | 10/2002 | Alyassin et al. |
| 6,484,047 | B1 | 11/2002 | Vilsmeier |
| 6,611,615 | B1 | 8/2003 | Christensen |
| 6,628,845 | B1 | 9/2003 | Stone et al. |
| 6,640,201 | B1 | 10/2003 | Hahlweg |
| 6,647,154 | B1 | 11/2003 | Hahlweg |
| 6,671,423 | B1 | 12/2003 | Fujimoto et al. |
| 6,681,057 | B1 | 1/2004 | Nair et al. |
| 6,701,006 | B2 | 3/2004 | Moore et al. |
| 6,728,424 | B1 | 4/2004 | Zhu et al. |
| 6,760,037 | B2 | 7/2004 | Kallay et al. |
| 6,788,827 | B1 | 9/2004 | Makram-Ebeid |
| 6,909,794 | B2 | 6/2005 | Caspi |
| 6,937,750 | B2 | 8/2005 | Natanzon et al. |
| 6,950,542 | B2 | 9/2005 | Roesch et al. |
| 6,990,255 | B2 | 1/2006 | Romanik et al. |
| 7,020,311 | B2 | 3/2006 | Breeuwer |
| 7,062,078 | B2 | 6/2006 | Weese et al. |
| 2001/0036302 | A1 | 11/2001 | Miller |
| 2002/0012478 | A1 | 1/2002 | Thirion et al. |
| 2003/0095696 | A1 | 5/2003 | Reeves et al. |
| 2003/0174872 | A1 | 9/2003 | Chalana et al. |
| 2003/0216631 | A1 | 11/2003 | Bloch et al. |
| 2005/0013471 | A1 | 1/2005 | Snoeren et al. |
| 2005/0147325 | A1 | 7/2005 | Chen et al. |
| 2005/0190189 | A1 | 9/2005 | Chefd'hotel et al. |
| 2005/0219558 | A1 | 10/2005 | Wang et al. |
| 2005/0249434 | A1 | 11/2005 | Xu et al. |
| 2006/0002631 | A1 | 1/2006 | Fu et al. |
| 2006/0002632 | A1 | 1/2006 | Fu et al. |
| 2006/0004275 | A1 | 1/2006 | Vija et al. |
| 2006/0029291 | A1 | 2/2006 | Sun et al. |
| 2006/0093240 | A1 | 5/2006 | Sabuneu et al. |

FOREIGN PATENT DOCUMENTS

| | | |
|---|---|---|
| WO | 02/056241 A1 | 7/2002 |
| WO | 2004/063990 A1 | 7/2004 |

OTHER PUBLICATIONS

Hero, Applications of entropic spanning graphs, Sep. 2002, IEEE, vol. 19, Issue 5, pp. 85-95.*

A.O. Hero, B. Ma, O. Michel and J. Gorman, "Applications of entropic spanning graphs, " (.pdf) <http://www.eecs.umich.edu/%7Ehero/Preprints/spmag_ma_01.pdf>, in IEEE Slgnal Proc. Magazine (Special Issue on Mathematics in Imaging), vol. 19, No. 5, pp. 85-95, Sep. 2002. IEEE Explore reprint (.pdf).

H. Neemuchwala, A.O. Hero, and P.L. Carson, "Image registration using alpha-entropy measures and entropic graphs," in Proceedings of Asilomar Conference on Signals and Systems (.pdf) <http://www.eecs.umich.edu/%7Ehero/Preprints/asilomar2002>.

B. Ma, A. O. Hero, J. Gorman and O. Michel "Image registration with minimal spanning tree algorithm", (.pdf) <http:// www.eecs.umich.edu/%7Ehero/Preprints/ma_icip00.pdf>, /2000 IEEE International Conf. on Image Processing, /, Vancouver, Oct. 2000.

H. Neemuchwala and A. O. Hero, Multi-Sensor Image Fusion and its Applications, chapter Entropic Graphs for Registration, p. to appear, Marcel Dekker, 2005.

Oubel, Frangi & Hero, "Complex Wavelets for Registration of Tagged MRI Sequences", 2005.

Park, Bland, Hero, and Meyer, "Target Selection Method in Atlas Construction Based on Multidimensional Scaling" Submission to IEEE Trans. on Medical Imaging. pp. 1-27, 2005.

H. Neemuchwala and A. O. Hero, "Image registration in high dimensional feature space," in Proceedings of Conference on Electro-Imaging, p. to appear, San Jose, CA, Jan. 2005.

C. Studholme, "Simultaneous population Based Image Alignment for Template Free Spatial Normalisation of Brain Anatomy", in Biomedical Image Registration—WBIR, 2003, pp. 81-90.

J.L. Boes and C.R. Meyer, "Multi-variate Mutual Information for Registration", in Taylor, C., Colchester, A., eds. : Medical Image Computing and Computer-assisted intervention (MICCAI). (1999), vol. 1679 of Lecture notes in Computer Science. SpringerVerlag, pp. 606-612.

C. Studholme, D.L.G. Hill and D.J. Hawkes, "An overlap Invariant Entropy Measure of 3D Medical Image Alignment", Pattern Recognition, 32 (1999) pp. 71-86.

A. Collignon, F. Maes, D. Delaere, D. Vandermeulen, P. Suetens, and G. Marchal, "Automated Multi-modality Image Registration Based on Information Theory", In Y. Bizais, C. Barillot, and R.D. Paola (Eds.), "Proceedings of Information Processing in Medical Imaging". (1995) pp. 263-274. Kluwer Academic Publishers, Brest, France.

C. Studholme, J.A. Little, P.P. Graeme, D.L.G.Hill, and D.J. Hawkes, "Automated Multimodality Registration Using the Full Affine Transformation: Application to MR and CT Guided Skull Base Surgery", Visualization in Biomedical Computing. DOI 10.1007/BFB0047003. vol. 1131. (1996) pp. 601-606.

D. Rueckert, C. Hayes, C. Studholme, P. Summers, M. Leach, and D.J. Hawkes, "Non-rigid Registration of Breast MR Images Using Mutual Information", DOI 10.1007/BFb0056304, Series Lecture Notes in Computer Science Volume, vol. 1496(1998) pp. 1144-1152. In Medical Image Computing and Computer-assisted Interventation—MICCAI (1998).

K.K.Bhatia, J.V. Hajnal, B.K. Puri, A.D. Edwards and D. Rueckert, "Consistent Groupwise Non-Rigid Redistration for Atlas Construction", /IEEE Symposium on Biomedical Imaging (ISBI)/ Arlington (2004) pp. 908-911.

W.R Crum, O. Camara, D. Rueckert, K. K. Bhatia, M. Jenkinson, and D.L.G. Hill, "Generalised Overlap Measures for Assessment of Pairwise and Groupwise Image Registration and Segmentation", /Seventh International Conference on Medical Image Computing and Computer-assisted Intervention (MICCAI)/, Lecture Notes in Computer Science, Palm Springs, 2005.

* cited by examiner

METHOD OF DETERMINING ALIGNMENT OF IMAGES IN HIGH DIMENSIONAL FEATURE SPACE

CROSS REFERENCE TO RELATED APPLICATION

This application claims priority to Provisional Patent Application Ser. No. 60/658,427, filed Mar. 4, 2005.

STATEMENT REGARDING FEDERALLY SPONSORED RESEARCH OR DEVELOPMENT

This invention was made with government support under 1P01CA87634 awarded by National Institute of Health (NIH) and under DAAD19-02-1-0262 awarded by Army Research Office (ARO). The government has certain rights in the invention.

Computer Code

Portions of the subject application are contained on a single compact disc and are incorporated herein by reference. The compact disc is titled "Computer Code" in IBM-PC machine format, compatible with MS-Windows. and contains seven files in ASCII file format having the following files names: 1mstkruskal.txt; 2mstprim.txt: 3hpmst.txt: 4knngkd.txt: 5miknng.txt: 6gaknng.txt: and 7nonlinknng.txt.

BACKGROUND OF THE INVENTION

1. Field of the Invention

The subject invention relates to a method of determining alignment of images in high dimensional feature space, and more specifically, to determining alignment of a sequence of images of different modalities from various types of applications.

2. Description of the Prior Art

Registering images aligns a target image onto a source, or reference, image using various registration algorithms to enhance image correlation, remove geometric distortion, and to facilitate various image processing tasks, such as image analysis, segmentation, understanding, visualization, and rendering. Image registration methods select a sequence of intensity preserving transformations, or algorithms, to maximize an image similarity measure between the reference image and the target image. Image registration has wide applications in medical imaging, DNA sequencing, video motion analysis, satellite imagery, remote sensing, security and surveillance. The accuracy of the registration algorithm critically depends on two factors: the selection of a highly discriminating image feature space and the choice of similarity measure to match these image features. These factors are especially important when some of the intensity differences are due to the sensor itself, as arises in registration with different types of imaging sensors or registration of speckle-limited images.

Multi-sensor images typically have intensity maps that are unique to the sensors used to acquire them and a direct linear correlation between intensity maps may not exist. Several other matching functions have been suggested in D. Hill, P. Batchelor, M. Holden, and D. Hawkes, "Medical image registration," Phys. Med. Biol., vol. 26, pp. R1-R45, 2001; M. Jenkinson, P. Bannister, M. Brady, and S. Smith, "Improved methods for the registration and motion correction of brain images," Oxford University, Tech. Rep., 2002; and C. Penney, J. Weese, J. Little, D. Hill, and D. Hawkes, "A comparison of similarity measures for used in 2-D-3-D medical image registration," IEEE Trans. on Medical Imaging, vol. 17, no. 4, pp. 586-595, 1998.

Some of the most widespread techniques are: histogram matching (J. Huang, S. Kumar, M. Mitra, and W. Zhu, "Spatial color indexing and applications," in Proc. of IEEE Int'l Conf. Computer Vision ICCV '98, pp. 602-608); texture matching (J. Ashley, R. Barber, M. Flickner, D. Lee, W. Niblack, and D. Petkovic, "Automatic and semiautomatic methods for image annotation and retrieval in qbic," in Proc. SPIE Storage and Retrieval for Image and Video Databases III, pp. 24-35); intensity cross correlation (J. B. Maintz and M. Viergever, "A survey of medical image registration," Medical Image Analysis, vol. 2, no. 1, pp. 1-36, 1998); optical flow matching (M. Lef'ebure and L. Cohen, "Image registration, optical flow and local rigidity," J. Mathematical Imaging and Vision, vol. 14, no. 2, pp. 131-147, 2001); kernel-based classification methods (N. Cristiani and J. Shaw-Taylor, Support Vector Machines and other kernel-based learning methods. Cambridge U. Press, 2000); and boosting classification methods (J. S. de Bonet and P. Viola, "Structure driven image database retrieval," in Advances in neural information processing, vol. 10, 1997; T. Kieu and P. Viola, "Boosting image retrieval," in IEEE Conference on Computer Vision and Pattern Recognition, 2000).

In such cases, it is well known that the standard linear cross correlation is a poor similarity measure. Previously, the images have been aligned based upon a single dimension feature, such as gray scale pixel intensity, using simple correlation techniques. These methods produce adequate results for images that are of a single modality. However, if the images are from different modalities or have high dimensional features, the single dimension feature approach does not produce adequate results.

Previous sequence alignment methods that can be applied to high dimensional data have been based on simple correlation measures that can handle the high computational load. When the sequence of images consists of only a few objects one can apply sophisticated methods that compute the entire empirical distribution of low dimensional features extracted from the sequence. These methods have superior performance when the features are well selected as they can adapt to non-linearities, spurious differences, and artifacts within the sequence. Examples include histogram equalization methods and methods based on minimizing joint entropy or maximizing mutual information (MI). However, these feature-distribution methods are difficult to apply as the dimension feature becomes high. Thus, these sequence alignment methods have been limited to low dimensional feature spaces, such as coincidences between pixel intensity levels.

The multi-modality images may arise from alignment of gene sequences over several genomes, across-modality registration of time sequences of patient scans acquired during cancer therapy, or simultaneous tracking of several objects in a video sequence. The previous sequence alignment methods fail when the objects in the sequence are high dimensional and are not exact replicates of each other, e.g., due to the presence of non intensity-preserving deformations or spurious noise and artifacts. In particular, computationally simple linear cross correlation methods fail to capture non-linear similarities between objects.

Entropic methods use a matching criterion based on different similarity measures defined as relative entropies between the feature densities. Entropic methods have been shown to be virtually unbeatable for some medical imaging image registration applications as discussed in C. R. Meyer, J. L. Boes, B. Kim, P. H. Bland, K. R. Zasadny, P. V. Kison, K. F. Koral, K.

A. Frey, and R. L. Wahl, "Demonstration of accuracy and clinical versatility of mutual information for automatic multimodality image fusion using affine and thin-plate spline warped geometric deformations," Medical Image Analysis, vol. 1, no. 3, pp. 195-206, April 1997 and D. Hill, P. Batchelor, M. Holden, and D. Hawkes, "Medical image registration," Phys. Med. Biol., vol. 26, pp. R1-R45, 2001.

Several properties of entropic methods have contributed to their popularity for image registration: 1) because they are statistically based measures they easily accommodate combinations of texture based and edge based registration features; 2) relative entropies are easily defined that are invariant to invertible intensity transformations on the feature space; and 3) they are simple to compute and the number of local maxima can be controlled by suitably constraining the set of image transformations.

The difficulty in applying these entropic methods to a long sequence of images becomes almost insurmountable since the dimension of the feature space grows linearly in the length of the sequence. In order to apply these methods to long sequences, each pair of images has to be analyzed thereby increasing the likelihood of introducing computational errors. Further, such previous entropic methods have resulted in a computational bottleneck that is a major hurdle for information based sequence alignment algorithms.

These related art methods are characterized by one or more inadequacy. Specifically, limitations of the prior linear correlation methods do not extend to higher dimensional features and the prior entropic methods are equally unworkable with regard to higher dimensional features. Accordingly, it would be advantageous to provide a method that overcomes these inadequacies.

SUMMARY OF THE INVENTION AND ADVANTAGES

The subject invention provides a method of determining alignment of images in high dimensional feature space. The method comprises registering a source image of a reference modality to a target image of a second modality with an algorithm based upon a measure of information affinity present in both of the source and target image to create a registered image. Next, a plurality of feature vectors are extracted from the registered image for each of the source and target images and a distribution of the feature vectors are plotted on an entropic graph. Edge lengths are determined between proximal feature vectors from the entropic graph and a similarity measure of one of an α-divergence estimate or an α-affinity estimate is determined based upon these edge lengths such that the α-divergence or α-affinity estimate indicate whether the source and target image are sufficiently registered.

The subject invention provides a method that overcomes the inadequacies that characterize the prior art methods. First, the subject invention is able to register images of multi-modalities based upon an information affinity such as mutual information (MI) through the use of the entropic graph and the edge lengths. Second, the subject invention is able to produce the information affinity without encountering any computational bottleneck. The subject invention is also able to analyze a long sequence of images in the same feature space simultaneously instead of having to perform multiple analyses on each pair of images.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

A method of determining alignment of images in high dimensional feature space is disclosed. The method is particularly useful for aligning images of different modalities. Examples of modalities includes, but are not limited to, X-ray imaging, Magnetic Resonance Imaging (MRI), functional MRI (fMRI), computed tomography (CT) imaging, single photon emission computed tomography (SPECT), and positron emission tomography (PET). Other non-medical uses of the subject invention may include alignment of gene sequences over several genomes, simultaneous tracking of several objects in a video sequence, audio waveforms, and satellite imagery.

The subject invention registers a source image of a reference modality to a target image of a second modality. Preferably, the subject invention is well suited to register two or more images in the feature space. Specifically, the subject invention is robust enough to handle relatively long sequences of images. As one example, the subject invention may be used to register sequences of images obtained from security camera for facial recognition. Various types of features may be utilized by the subject invention. Illustrative examples of features include, but are not limited to, pixel gray level, location of pixel intensity such as upper left, lower left, etc., edges in the images, measures of texture, orientation between 0° and 360°, and curviness/deviation from straightness. The subject invention is able to determine the alignment of the images based upon combinations of various features.

Figure 1:
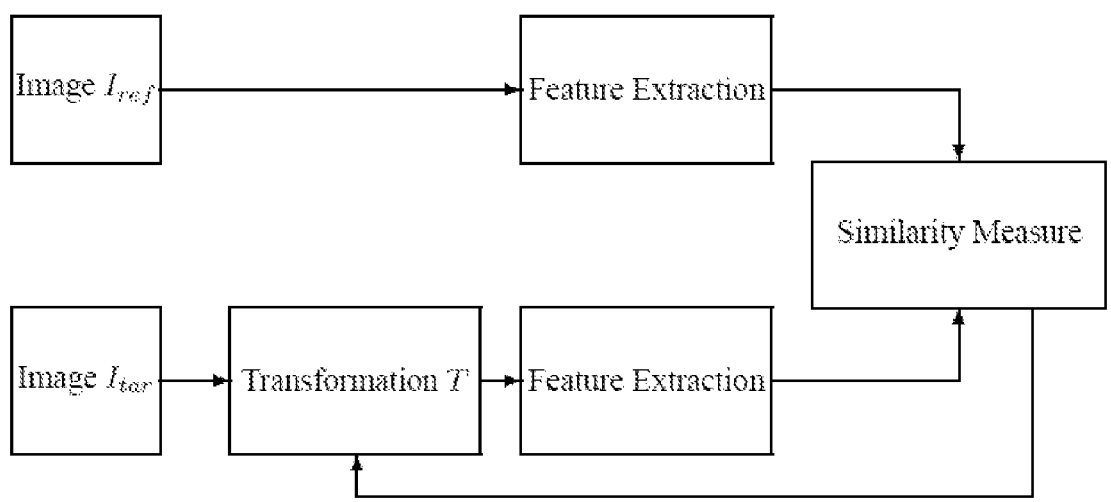
FIG. 1 is a block diagram of an image registration system.

Referring to FIG. 1, the three main components of an image registration system are shown. The system includes (1) definition and extraction of features that discriminate between different image poses $I_{ref}$ and $I_{tar}$; (2) adaptation of a matching criterion that quantifies feature similarity and is capable of resolving important differences between images, yet is robust to image artifacts; and (3) implementation of optimization techniques which allow fast search over possible transformations T. The subject invention is principally concerned with the second component of the system, which is the choice of matching criterion between the images and may also be called a similarity or dissimilarity measure. It is to be appreciated by those of ordinary skill in the art that the similarity measure between the source image and the target image is based upon a α-divergence or α-affinity estimate indicating whether the source and target image are sufficiently registered in the registered image.

The system is extendible to alignment of a sequence of images $\{I_0, \ldots, I_M\}$ by 1) identifying one member of this sequence, e.g., $I_0$, as the source, or reference, image $I_{ref}$; 2) redefining $I_{tar}$ as the sequence of target images $\{I_0, \ldots, I_M\}$; and 3) redefining the transformation T as a transformation $[T_1; \ldots; T_M]$ on the sequence $T_{tar}$ of target images. The rest of the elements of the system in FIG. 1 remain the same as discussed above. In particular, the image matching criterion is applied to the pair $(I_{ref}; I_{tar})$ as before.

Figure 2A:
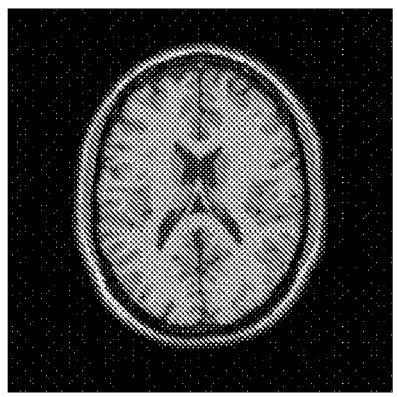
FIG. 2A is an MRI image of the brain with additive noise, T1 weighted $I_1$.
Figure 2B:
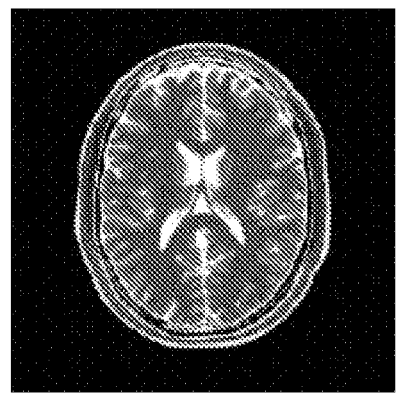
FIG. 2B is an MRI image of the brain with additive noise, T2 weighted $I_2$.
Figure 3:
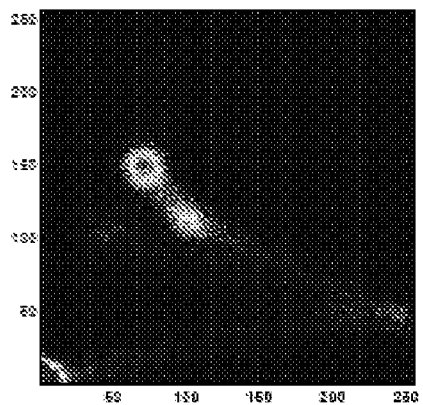
FIG. 3 is a joint gray-level pixel coincidence histogram from registering FIGS. 2A and 2B.

With reference to FIGS. 2A and 2B, FIG. 2A is an MRI image of the brain with additive noise, T1 weighted $I_1$ and FIG. 2B is an MRI image of the brain with additive noise, T2 weighted $I_2$. Although acquired by a single sensor, the time weighting renders different intensity maps to identical structures in the brain. Thus, a joint gray-level pixel coincidence histogram, shown in FIG. 3, of FIGS. 2A and 2b is clustered and does not exhibit a linear correlation between intensities. The subject invention is able to register such images with an algorithm based upon a measure of information affinity present in both of the source and target image to create the registered image. Preferably, the subject invention utilizes mutual information (MI), but other types of information affinities may be used in place of mutual information.

The MI can be interpreted as a similarity measure between the reference and target pixel intensities or as a dissimilarity measure between the joint density and the product of the marginals of these intensities. Let $X_0$ be a reference image and consider a transformation of the target image $(X_1)$, defined as $X_T = T(X_1)$. Assume that the images are sampled on a grid of M×N pixels, a pair of feature vectors, such as (scalar) gray levels, are extracted. The feature vectors are defined as $(z_{0k}, z_{Tk})$ and extracted from the k-th pixel location in the reference and target images, respectively.

Figure 4A:
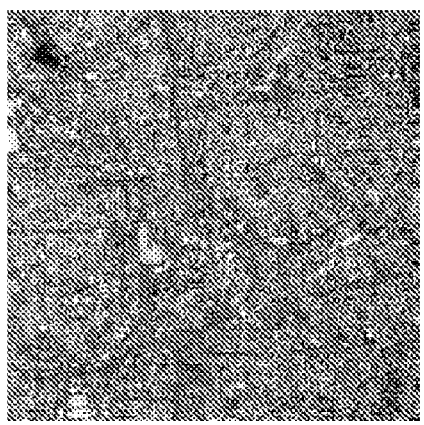
FIG. 4A is a visible image, $I_1$, of Atlanta, Ga. acquired via satellite.
Figure 4B:
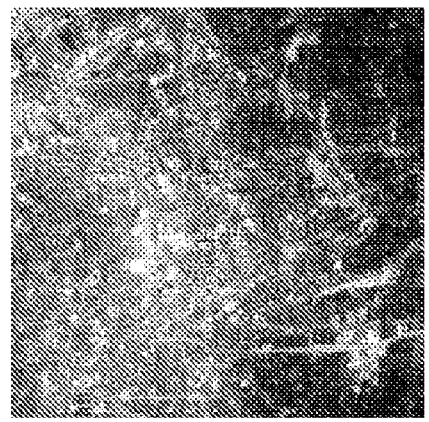
FIG. 4B is a thermal infrared image, $I_2$, of Atlanta, Ga. acquired via satellite.
Figure 4C:
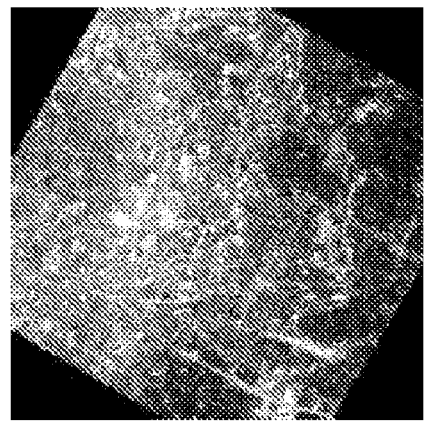
FIG. 4C is a thermal infrared image, $T(I_2)$, of Atlanta, Ga. acquired via satellite shown in FIG. 4B that has been rotated.
Figure 5A:
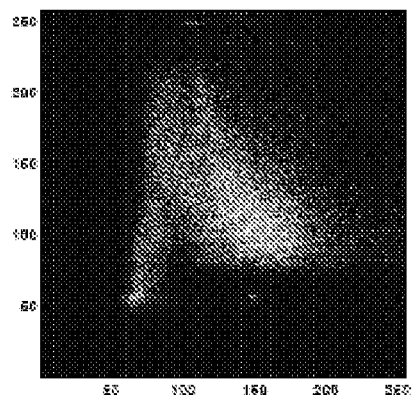
FIG. 5A is a joint gray-level pixel coincidence histogram from registering FIGS. 4A and 4B.
Figure 5B:
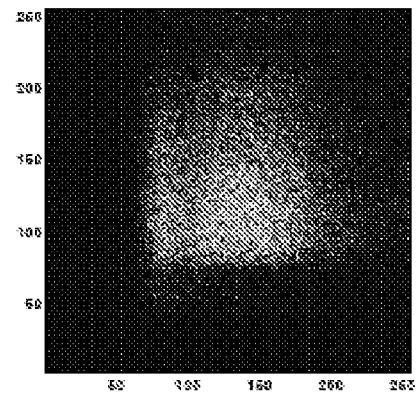
FIG. 5B is a joint gray-level pixel coincidence histogram from registering FIGS. 4A and 4C.

The basic assumption underlying MI image registration is that $\{(z_{0k}, z_{Tk})\}_{k=1}^{MN}$ are independent identically distributed (i.i.d) realizations of a pair $(Z_0, Z_T)$, $(Z_T = T(Z_1))$ of random variable having joint density $f_{0,1}(z_0, z_T)$. If the reference and the target images were perfectly correlated, i.e. identical images, then $Z_0$ and $Z_T$ would be dependent random variables. FIG. 4A is a visible image, $I_1$, of Atlanta, Ga. acquired via satellite and FIG. 4B is a thermal infrared image, $I_2$, of Atlanta, Ga. acquired via satellite. FIG. 4C is a thermal infrared image, $T(I_2)$, of Atlanta, Ga. acquired via satellite shown in FIG. 4B that has been rotated. Referring to FIGS. 4A, 4B, and 4C, the MI alignment procedure is illustrated through a multi-sensor remote sensing example. Aligned images acquired by visible and thermally sensitive satellite sensors, generate a joint gray level pixel coincidence histogram $f_{0,1}(z_0, z_1)$. Note that in FIG. 5A the joint gray-level pixel coincidence histogram is not concentrated along the diagonal due to the multi-sensor acquisition of the images. When the thermal image is rotationally transformed, the corresponding joint gray-level pixel coincidence histogram, shown in FIG. 5B, $f_{0,1}(z_0, z_T)$ is dispersed, thus yielding lower mutual information than before.

Figure 6A:
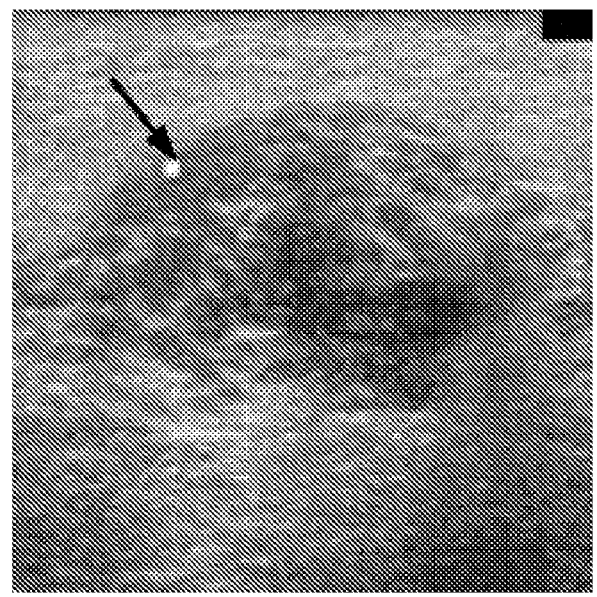
FIG. 6A is an ultrasound breast image.
Figure 6B:
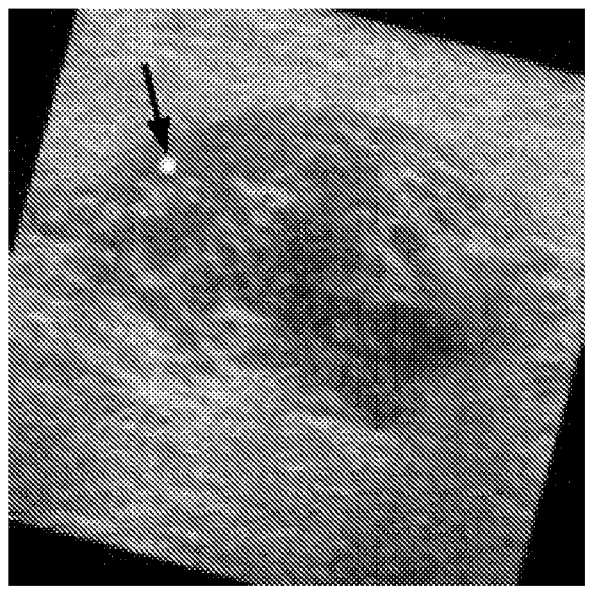
FIG. 6B is an ultrasound breast image shown in FIG. 6A that has been rotated by about 8°.
Figure 7A:
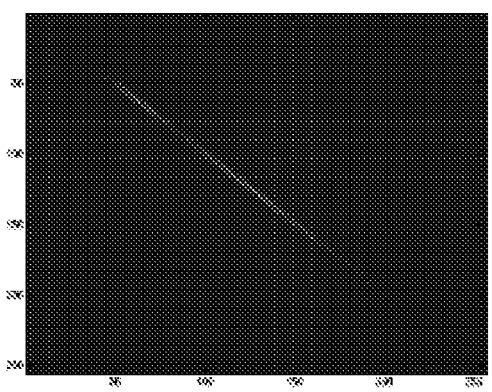
FIG. 7A is a joint coincidence histogram from registering FIG. 6A with itself, i.e., perfect alignment.
Figure 7B:
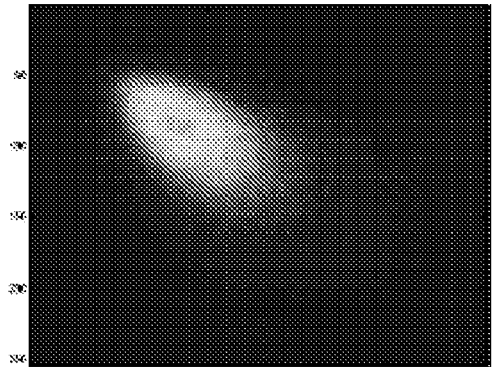
FIG. 7B is a joint coincidence histogram from registering FIG. 6A with FIG. 6B.
Figure 7C:
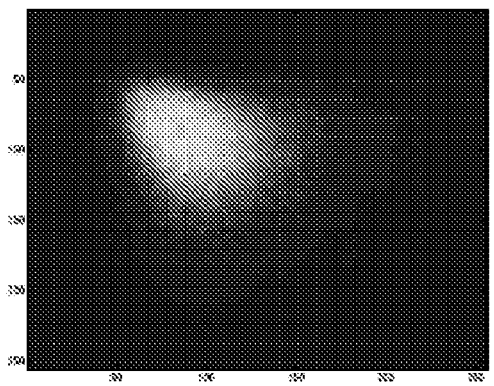
FIG. 7C is a joint coincidence histogram from registering FIG. 6A with another ultrasound breast image separated by about 2 mm.
Figure 7D:
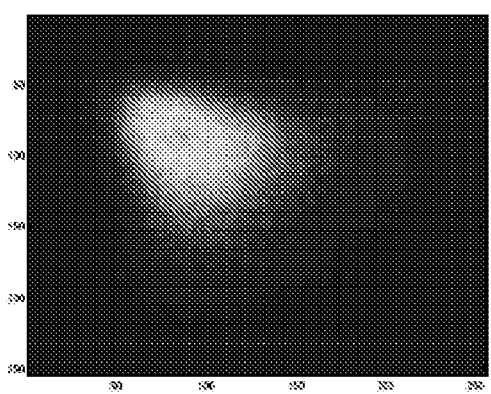
FIG. 7D is a joint coincidence histogram from registering FIG. 6A with another ultrasound breast image separated by about 2 mm and rotated about 8°.

Yet another example utilizing MI is shown in FIGS. 6A and 6B. FIG. 6A is an ultrasound breast image and FIG. 6B is an ultrasound breast image shown in FIG. 6A that has been rotated by about 8°. Applying MI as discussed above, a joint coincidence histogram from registering FIG. 6A with itself, i.e., perfect alignment; is shown in FIG. 7A. FIG. 7B is a joint coincidence histogram from registering FIG. 6A with FIG. 6B. As can be seen, FIG. 7B yields lower mutual information. FIG. 7C is a joint coincidence histogram from registering FIG. 6A with another ultrasound breast image separated by about 2 mm and FIG. 7D is a joint coincidence histogram from registering FIG. 6A with another ultrasound breast image separated by about 2 mm and rotated about 8°. As can again be seen, lower mutual information is present in these histograms, thus illustrating one disadvantage of using MI to register such images.

On the other hand, if the images were statistically independent, the joint density of $Z_0$ and $Z_T$ would factor into the product of the marginals $f_{0,1}(z_0, z_T) = f_0(z_0)f_1(z_T)$. As a result of this, the subject invention uses a α-divergence expressed as $D_\alpha(f_{0,1}(z_0, z_T) \| f_0(z_0) f_1(z_T))$ between $f_{0,1}(z_0, z_T)$ and $f_0(z_0)f_1(z_T)$ as a similarity measure. For $\alpha \in (0, 1)$, the above α-divergence becomes α-mutual information (α-MI) between $Z_0$ and $Z_T$ and has the general formula:

$$\alpha MI = D_\alpha(f \| g) = \frac{1}{\alpha - 1} \log \int f^\alpha(x, y) f^{1-\alpha}(x) f^{1-\alpha}(y) dx dy.$$

Utilizing α-MI, the subject invention is better suited to handle registration of FIGS. 4B and 4C and FIGS. 6A and 6B as will be discussed in further detail below.

Yet another similarity measure that may be used with the subject invention is an α-geometric-arithmetic (α-GA) divergence. Given continuous distributions f and g, then α-GA divergence has the general formula:

$$\alpha D_{GA}(f, g) = D_\alpha(pf + qg \| f^p g^q)$$
$$= \frac{1}{\alpha - 1} \log \int (pf(z) + qg(z))^\alpha (f^p(z)g^q(z))^{1-\alpha} dz$$

The α-GA divergence is a measure of discrepancy between the arithmetic mean and the geometric mean off and g, respectively, with respect to weights p, q=1−p, and p ∈[0,1]. The α-GA divergence interprets the dissimilarity between the weight arithmetic mean $pf(x)+qg(x)$ and the weighted geometric mean $f(x)g^q(x)$.

Still another similarity measure that may be used is a Henze-Penrose (HP) divergence. While divergence measures dissimilarity between distributions, similarity between distributions can be measured by affinity measures. One measure of affinity between probability distributions f and g is expressed as the general formula:

$$A_{HP}(f, g) = 2pq \int \frac{f(z)g(z)}{pf(z) + qg(z)} dz$$

with respect to weights p, q=1−p, and p ∈[0,1]. This affinity was introduced in N. Henze and M. Penrose, "On the multivariate runs test," Annals of Statistics, vol. 27, pp. 290-298, 1999 as the limit of the Friedman-Rafsky statistic disclosed in J. H. Friedman and L. C. Rafsky, "Multivariate generalizations of the Wald-Wolfowitz and Smirnov two-sample tests," Annals of Statistics, vol. 7, no. 4, pp. 697-717, 1979. The subject invention translates the affinity measure into a divergence measure, the HP divergence, expressed in the general formula below:

$$D_{HP}(f \| g) = 1 - A_{FR}(f, g) = \int \frac{p^2 f^2(z) + q^2 g^2(z)}{pf(z) + qg(z)} dz$$

To date, no one has previously applied the HP divergence to image registration. Any of the above three similarity measures may be used with large feature dimensions according to the subject invention. In the prior art methods, such similarity measures were not workable because as high dimensional feature spaces can be more discriminatory, a barrier was created to performing robust high resolution histogram-based entropic registration.

The subject invention overcomes this barrier by estimating the α-entropy via an entropic graph whose vertices are the locations of the feature vectors in feature space. The feature vectors are extracted from the registered image for each of the source and target images and plotted on the entropic graph. As the images are better aligned, the feature vectors will become more closely clustered. The α-entropy is based upon edge lengths between distributions of the feature vectors from the entropic graph. Said another way, the entropic graph is further defined as a minimal graph spanning the feature vectors that minimizes a function of the total edge length of the minimal graph and that approximates the α-affinity or α-divergence of the distribution of the feature vectors. Once the edge length is known, the α-divergence estimate or the α-affinity estimate is determined and the similarity measure is determined as discussed above. The entropic graph reveals which feature vectors are closest to each other, i.e. proximal in the sense of being connected by a (single) edge of the graph.

The entropic graph is preferably based upon one of a minimum spanning tree (MST), a k-nearest neighbor graph (k-NNG), a Steiner tree, a Delaunay triangulation, or a traveling salesman problem (TSP). More preferably, the entropic graph is based on either the MST or the k-NNG.

A spanning tree is a connected acyclic graph which passes through all n feature vectors in Zn. The MST connects these points with n-1 edges, denoted $\{e_i\}$, in such a way as to minimize the total length as expressed in the general formula:

$$L_\gamma(Z_n) = \min_{e \in T} \sum_e \|e\|^\gamma,$$

where T denoted the class of acyclic graph (trees) that span $Z_n$.

Figure 8:
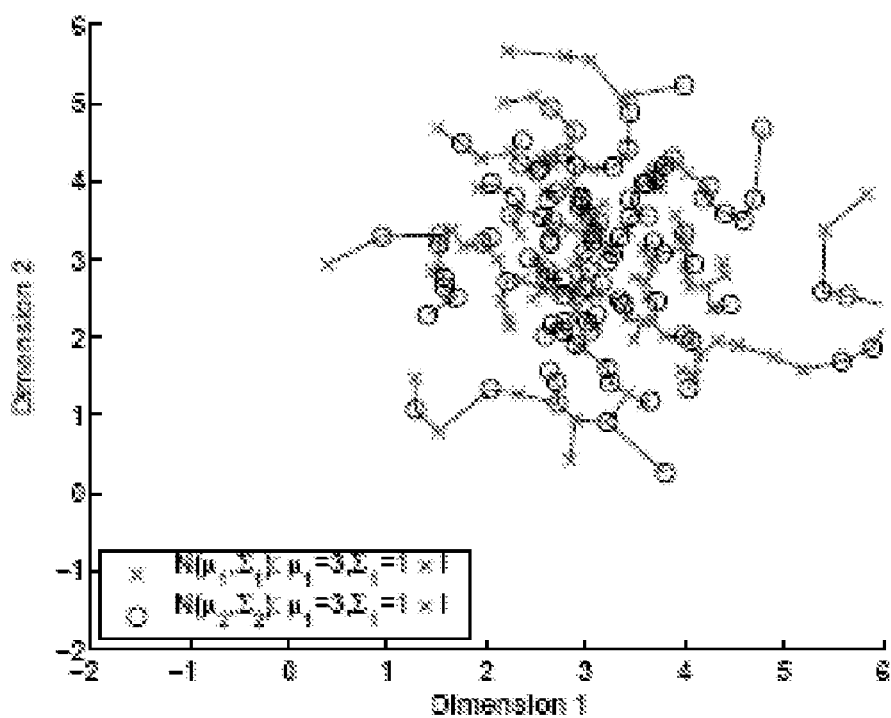
FIG. 8 is a graphical illustration of a minimal spanning tree for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$.
Figure 9:
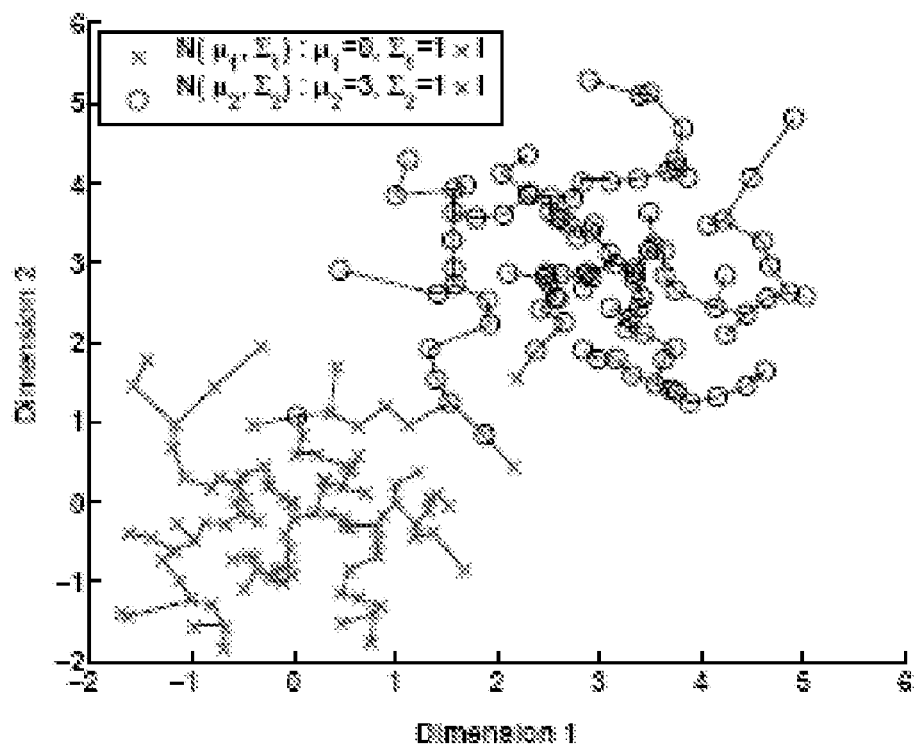
FIG. 9 is a graphical illustration of a minimal spanning tree for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

Referring to FIG. 8, a graphical illustration of a MST for a Gaussian case of two bivariate normal distributions $N(\mu_1, \Sigma_1)$ and $N(\mu_2, \Sigma_2)$ is shown. The 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$. FIG. 9 is a graphical illustration of a MST for a Gaussian case of two bivariate normal distributions $N(\mu_1, \Sigma_1)$ and $N(\mu_2, \Sigma_2)$. The 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

The MST approach to estimating a α-Jensen difference between feature densities of two images can be implemented as follows. Assume two sets of feature vectors $$Z_0 = \{z_0^{(i)}\}_{i=1}^{n_0} \text{ and } Z1 = \{z1\}_{i=1}^{n_1}$$

are extracted from images $X_0$ and $X_1$ and are i.i.d. realizations from multivariate densities $f_0$ and $f_1$, respectively. Define the set union $Z=Z_0 \cup Z_1$ containing $n=n_0+n_1$ unordered feature vectors. If $n_0$, $n_1$ increase at constant rate as a function of n then any consistent entropy estimator constructed from the vector $$\{Z^{(i)}\}_{i=1}^{n_0+n_1}$$

will converge to $H_\alpha(pf_0+qf_1)$ as $n \to \infty$ where $p=\lim_{n\to\infty}$ $$\frac{n_0}{n}.$$

This motivates the following finite sample entropic graph estimator of α-Jensen difference:

$$\Delta \hat{H}_\alpha(p, f_0, f_1) = \hat{H}_\alpha(Z_0 \cup Z_1) - [p\hat{H}_\alpha(Z_0) + q\hat{H}_\alpha(Z_1)],$$

where $p=n_0/n$, $\hat{H}_\alpha(Z_0 \cup Z_1)$ is the MST entropy estimator constructed on the n point union of both sets of feature vectors and the marginal entropies $\hat{H}_\alpha(Z_0)$, $\hat{H}_\alpha(Z_1)$ are constructed on the individual sets of $n_0$, $n_1$ feature vectors, respectively. The MST based estimator as determined above can easily be implemented in high dimensions, it bypasses the complications of choosing and fine tuning parameters such as histogram bin size, density kernel width, complexity, and adaptation speed, since the topology of the MST does not depend on the edge weight parameter γ, the MST α-entropy estimator can be generated for the entire range of $\alpha \in (0,1)$ once the MST for any given α is computed.

Figure 10:
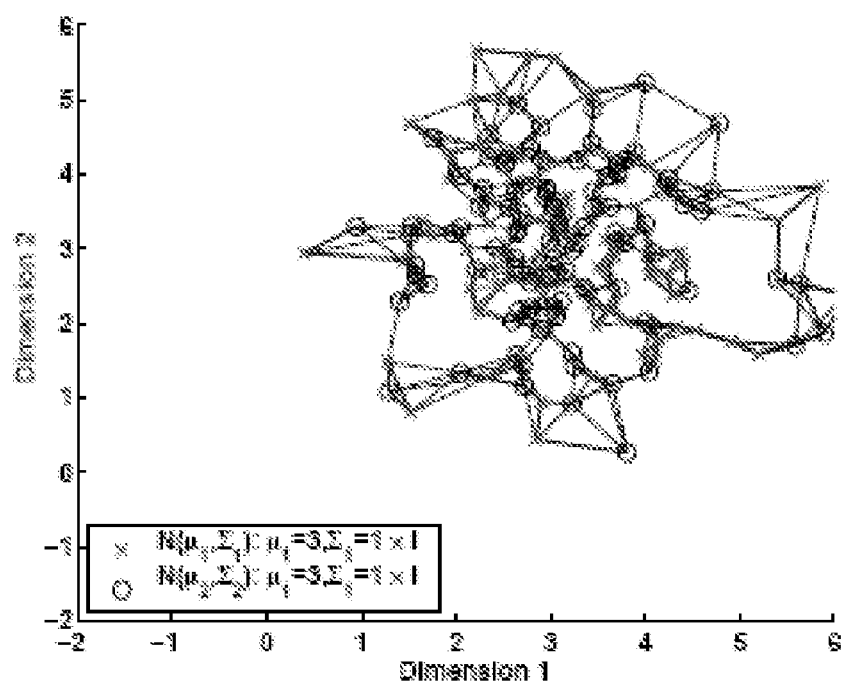
FIG. 10 is a graphical illustration of a k-nearest neighbor graph (k-NNG) for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$.
Figure 11:
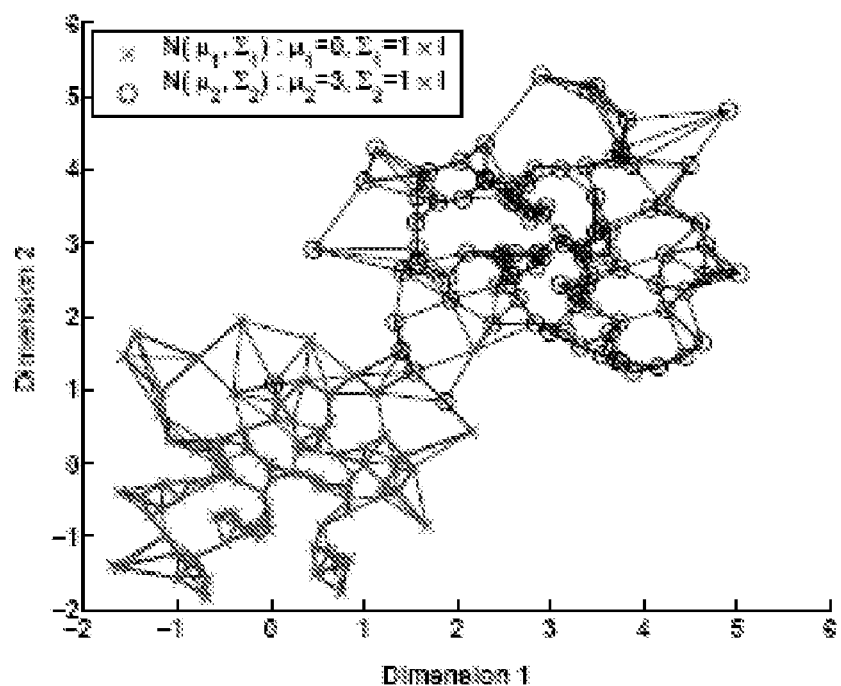
FIG. 11 is a graphical illustration of a k-NNG for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

With reference to FIG. 10, a graphical illustration of a k-NNG for a Gaussian case of two bivariate normal distributions $N(\mu_1, \Sigma_1)$ and $N(\mu_2, \Sigma_2)$ is shown. The 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$. FIG. 11 is a graphical illustration of a k-NNG for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

The k-NNG is a continuous quasi additive power weighted graph is a computationally attractive alternative to the MST. Given i.i.d vectors $Z_n$ in $R^d$, the 1-nearest neighbor of $z_i$ in $Z_n$ is given by $$\arg_{z \in Z_n - \{z_i\}} \min \|z - z_i\|,$$

where $\|z-z_i\|$ is the usual Euclidean ($L_2$) distance in $R^d$. For general integer $k \geq 1$, the k-nearest neighbor of a point is defined in a similar way. The k-NNG graph puts a single edge between each point in $Z_n$ and its k-nearest neighbor. Let $N_{k,i}=N_{k,i}(Z_n)$ be the set of k-nearest neighbors of $z_i$ in $Z_n$. The k-NN problem consists of finding the set of $N_{k,i}$ for each point $z_i$ in the $Z_n-\{z\}$.

This problem has exact solution which run in linear-log-linear time and the total graph length is:

$$L_{\gamma,k}(Z_n) = \sum_{i=1}^{N} \sum_{e \in N_{k,i}} \|e\|^\gamma.$$

In general, the k-NNG will count edges at least once, but sometimes count edges more than once. If two points, $X_1$ and $X_2$ are mutual k-nearest neighbors, then the same edge between $X_1$ and $X_2$ will be doubly counted.

Analogously to the MST, the log length of the k-NNG has limit $$\lim_{n \to \infty} \log\left(\frac{L_{\gamma,k}(X_n)}{n^\alpha}\right) = H_\infty(f) + c_{kNNG}, (a.s.).$$

Once again this suggest an estimator of the Renyi α-entropy:

$$\Delta \hat{H}_\alpha(Z_n) = \frac{1}{(1-\alpha)}[\log L_{\gamma,k}(Z_n)/n^\alpha - \log \beta_{d,\gamma,k}]$$

As in the MST estimate of entropy, the constant $C_{kNNG}=(1-\alpha)^{-1} \log \beta_{d,\gamma,k}$ can be estimated off-line by Monte Carlo simulation of the k-NNG on random samples drawn from the unit cube. A related k-NNG is the graph where edges connecting two points are counted only once, referred to as a single-count k-NNG. Such a graph estimator eliminates one of the edges from each point pair that are mutual k-nearest neighbors. A k-NNG can be built by pruning such that every unique edge contributes only once to the total length. The resultant graph has the identical appearance to the initial unpruned k-NNG, when plotted on the page. However, the cumulative length of the edges in the graphs differ, and so does their β factor.

Figure 12:
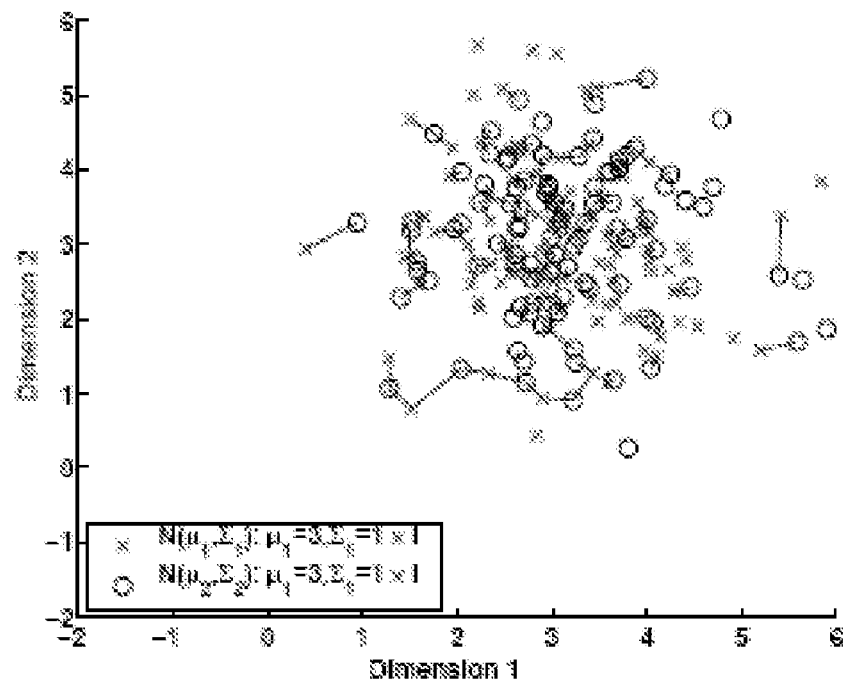
FIG. 12 is a graphical illustration of a Henze-Penrose (HP) affinity for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$.
Figure 13:
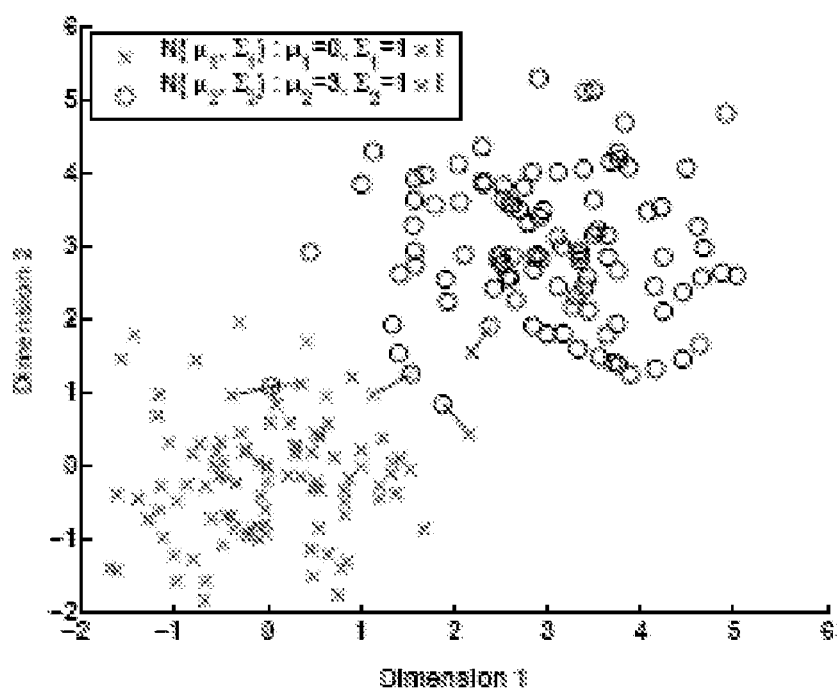
FIG. 13 is a graphical illustration of a HP affinity for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

Referring now to FIG. 12, a graphical illustration of a HP affinity for a Gaussian case of two bivariate normal distributions $N(\mu_1, \Sigma_1)$ and $N(\mu_2, \Sigma_2)$ is shown. The 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2$ and $\Sigma_1=\Sigma_2$. FIG. 13 is a graphical illustration of a HP affinity for a Gaussian case of two bivariate normal distributions $N(\mu_1, \Sigma_1)$ and $N(\mu_2, \Sigma_2)$, the 'x' labeled points are samples from $f_1(x)=N(\mu_1, \Sigma_1)$ and the 'o' labeled points are samples from $f_2(o)=N(\mu_2, \Sigma_2)$, and $\mu_1=\mu_2-3$ and $\Sigma_1=\Sigma_2$.

Once the above has been conducted, the subject invention may re-register the source image and the target image with a different algorithm to shorten the edge lengths from the entropic graph thereby improving the similarity measure therebetween.

The methods according to the subject invention may be put to many practical applications. Illustrative examples of such practical applications include registering images from whole breast imaging, constructing probabilistic atlases with a larger degree of certainty, feature-based matching, and registering tagged MRI sequences. A more detailed example of one application to ultrasound breast imaging is below and with reference to FIGS. 14-16.

Figure 14:
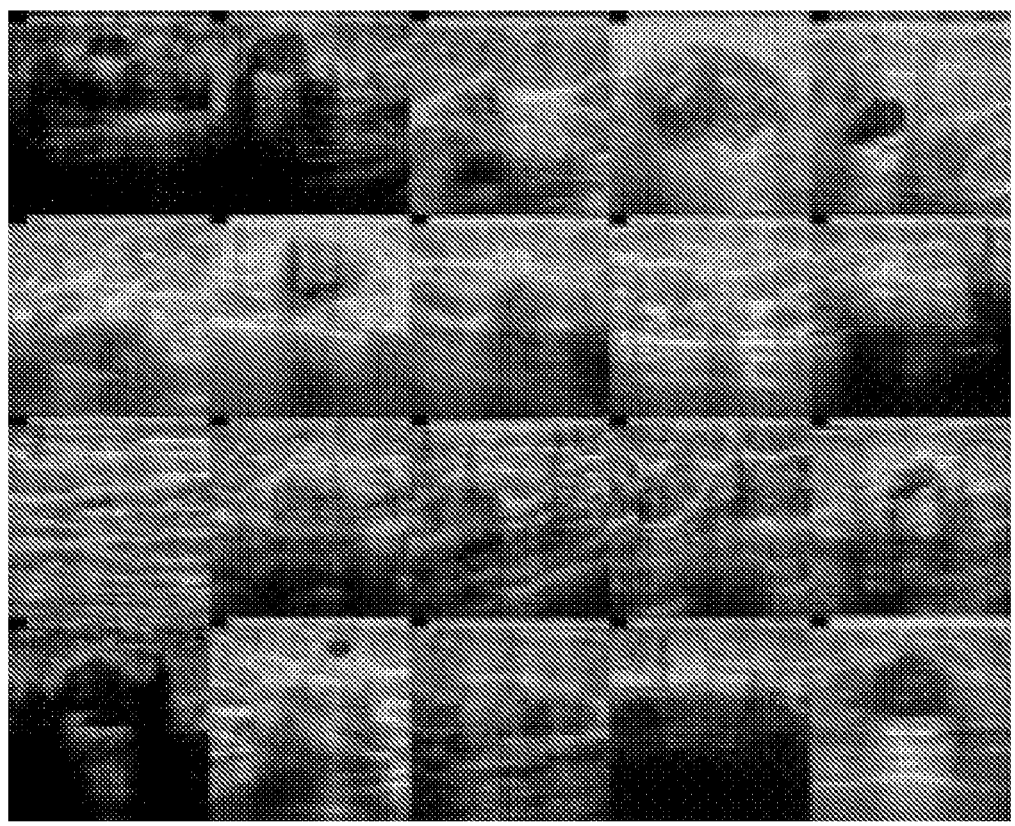
FIG. 14 is a composite of twenty 2-dimensional slices extracted from 3-dimensional volumetric ultrasound breast scans from twenty patients undergoing chemotherapy.

Ultrasound (US) imaging is an important medical imaging modality for whole breast imaging that can aid discrimination of malignant from benign lesions, can be used to detect multi-focal secondary masses, and can quantify response to chemotherapy or radiation therapy. Referring to FIG. 14, a set of twenty 2D slices extracted from a 3D volumetric US breast scanner is shown for twenty different patients (cases) receiving chemotherapy. The women were imaged on their backs with the transducer placed so as to image through the breast toward the chest wall. Some of the cases clearly exhibit tumors (delineated masses with shadows), others exhibit significant connective tissue structure (bright thin lines or edges), and all have significant speckle noise and distortions.

In registering ultrasound images of the breast, the reference and secondary images have genuine differences from each other due to biological changes and differences in imaging, such as positioning of the tissues during compression and angle dependence of scattering from tissue boundaries. The tissues are distorted out of a given image plane as well as within it. Speckle noise, elastic deformations, and shadows further complicate the registration process thus making ultrasound breast images notoriously difficult to register. It is for this reason that conventional registration methods tend to have problems with US breast images. Here, the subject invention has an advantage of matching on high dimensional feature spaces implemented with entropic similarity metrics.

To benchmark the various registration methods studied, the mean squared registration error for registering a slice of US breast image volume to an adjacent slice in the same image volume (case) was examined. For each case, differing amounts of spatially homogeneous and independent random noise were added to both slices in order evaluate algorithm robustness. A training database of volumetric scans of 6 patients and a test database of 15 patient scans were created. Feature selection was performed using the training database and registration performance was evaluated over the test database. These databases were drawn from a larger database of 3D scans of the left or right breast of female subjects, aged 21-49 years, undergoing chemotherapy or going to biopsy for possible breast cancer. Each volumetric scan has a field of view of about 4 cm$^3$ (voxel dimensions 0.1 mm$^2$×0.5 mm) and encompasses the tumor, cyst or other structure of interest. The scans were acquired at 1 cm depth resolution yielding 90 cross-sectional images at 0.4 cm horizontal resolution. The patient data was collected with the intention to monitor therapy progress in the patients. Tumor/Cyst dimensions vary and can range from 5 mm$^3$ to 1 cm$^3$ or higher. This application was restricted to rotation transformations over ±16°.

The following results for vector valued features were constructed by projecting image patches onto a basis for the patch derived from independent component analysis (ICA). The ICA basis is especially well suited since it aims to obtain vector features which have statistically independent elements and can therefore facilitate estimation of α-MI and other entropic measures.

Specifically, in ICA, an optimal basis is found from a training set which decomposes images $X_i$ in the training set into a small number of approximately statistically independent components $\{S_j\}$ each supported on an 8×8 pixel block having the general formula:

$$X_i = \sum_{j=1}^{p} a_{ij} S_j$$

The basis elements $\{S_j\}$ was selected from an over-complete linearly dependent basis using randomized selection over the database. For image i the feature vectors $z_i$ are defined as the coefficients $\{a_{ij}\}$ in the above formula obtained by projecting each of its 8×8 sub-image blocks onto the basis.

Figure 15:
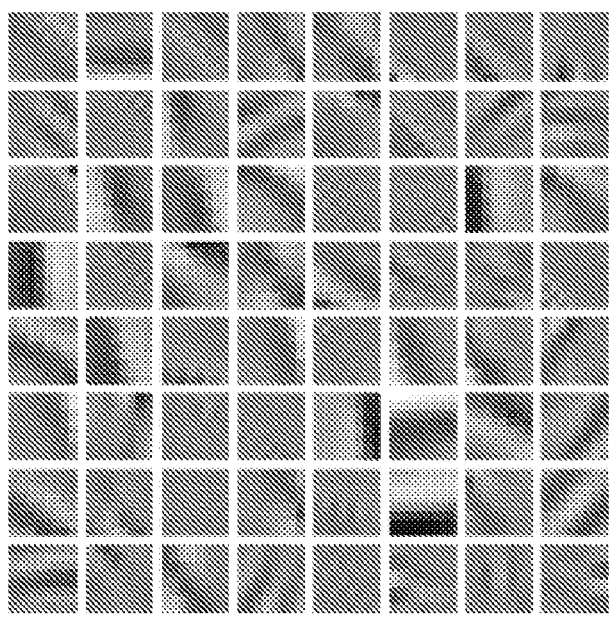
FIG. 15 is a representation of an 8×8 independent component analysis (ICA) set obtained from training on randomly selected 8×8 blocks in the ultrasound training database of breast scans. Features extracted from an image are the 66-dimensional vectors obtained by projecting all 8×8 neighborhoods of the image onto the ICA basis and including the spatial coordinate.

FIG. 15 illustrates the estimated 64 dimensional (8×8) ICA basis for the training database. The basis was extracted by training on over 100,000 randomly sampled 8×8 sub-images taken from the 6 volumetric breast ultrasound scans. The algorithm used for extraction was Hyvarinen and Oja's FastICA ICA code which uses a fixed-point algorithm to perform maximum likelihood estimation of the basis elements in the ICA data model above. Given this ICA basis and a pair of to-be-registered image slices, coefficient vectors are extracted by projecting each 8×8 neighborhood in the images onto the basis set. A single 66 dimensional feature sample is then created by concatenating the 64 dimensional coefficient vector with a two dimensional vector identifying the spatial coordinates of 8×8 neighborhood. For example $\{W_{(i,j)}, x_{(i,j)}, y_{(i,j)}\}$ represents the feature from the 8×8 image patch located at coordinate (i, j) in the image.

For each of the 15 scans in the test set, 2 image slices were extracted in the depth direction perpendicular to the skin, such that they showed the cross-section of the tumor. These two slices have a separation distance of about 5 mm. At this distance, the speckle decorelates but the underlying anatomy remains approximately unchanged. The first cross sectional slice was picked such that it intersected with the ellipsoidal-shaped tumor through its center. The second slice was picked closer to the edge of the tumor. These images thus show a natural decline in tumor size, as would be expected in time sampled scans of tumors responding to therapy. Since view direction changes from one image scan to the next for the same patient over time, rotational deformation is often deployed to correct these changes during registration. This effect was simulated by registering a rotationally deformed image with its unrotated slice-separated counterpart, for each patient in the 15 test cases. Rotational deformation was in steps of 2 degrees such that the sequence of deformations was [−16 −8 −4 −2 0 (unchanged) 2 4 8 16] degrees. Further, the images were offset (relatively translated) by 0.5 mm (5 pixels) laterally to remove any residual noise correlation since it can bias the registration results. Since some displacement can be expected from the handheld UL imaging process and the relative tissue motion of the compressible breast tissue, this is not unreasonable. For each deformation angle, divergence measures were calculated, where the 'registered state' is the one with 0 degrees of relative deformation.

Figure 16:
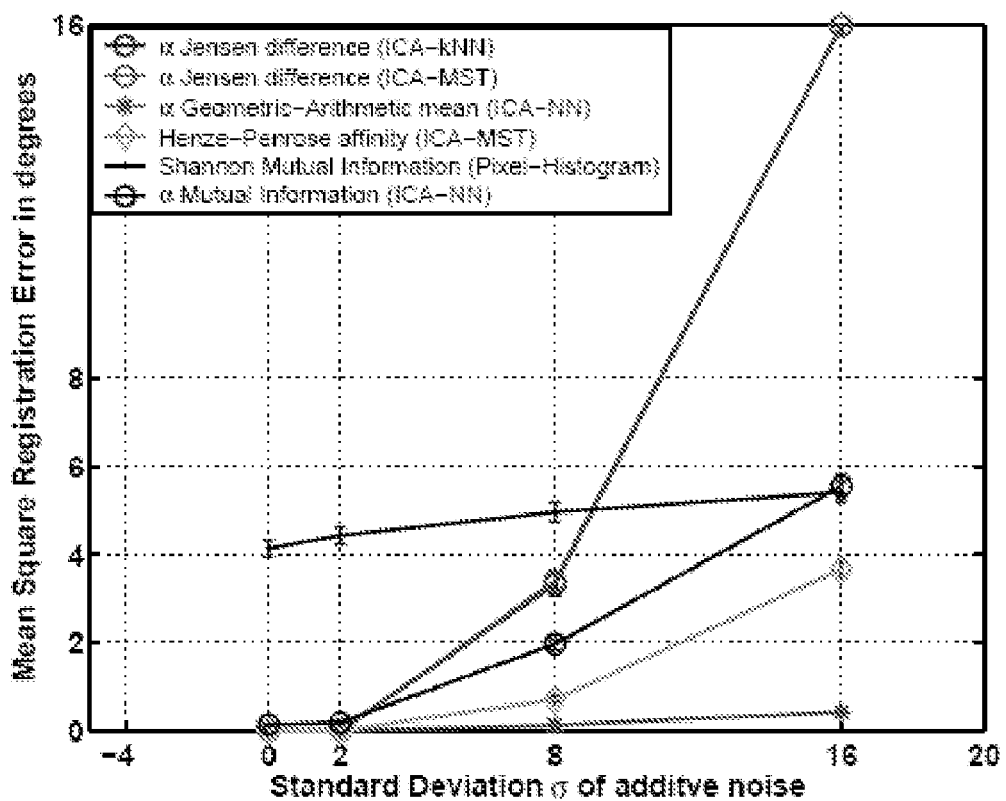
FIG. 16 is a graphical representation of a rotational root mean squared error obtained from registration of ultrasound breast images (FIGS. 14 and 15) using six different image similarity/dissimilarity criteria and standard error bars are as indicated. These plots were obtained by averaging 15 cases, each with 250 Monte Carlo trials adding noise to the images prior to registration, corresponding to a total of 3750 registration experiments.

For each extracted image slice, 250 noisy replicates were created by adding truncated Gaussian noise. Neighborhoods of the ultrasound image replicates were projected onto the 64 dimensional ICA basis and the spatially tagged projection coefficient vectors $W_{(i,j)}$ were extracted as features for registration. The root-mean-squared (rms) registration error is illustrated for six different algorithms in FIG. 16 as a function of the rms (truncated) Gaussian noise. Registration error was determined as the rms difference between the location of the peak in the matching criterion and the true rotation angle. FIG. 16, with the exception for the α-Jensen difference, illustrates that the standard single pixel MI underperforms relative to the other methods of the subject invention. It is believed, without intending to be bound, that this is due to the superiority of the 64 dimensional ICA features used by the methods of the subject invention. The α-Jensen difference implemented with kNN vs MST results in a nearly identical performance exhibiting less performance than the other metrics. Unlike the other metrics, the α-Jensen difference is not invariant to reparameterization, which explains its relatively poor performance for large rms noise. However, the α-GA divergence, α-MI, and HP affinity outperforms the Shannon MI based upon an entropy estimate that was picked from a histogram. The Shannon MI remained slightly above four to about 5.5. Whereas, the α-GA divergence, α-MI, and HP affinity remained mostly below four.

Another detailed example of a different application of the subject invention to multi-sensor satellite image fusion is below and with reference to FIGS. 17-20. Numerous sensors gather information in distinct frequency bands in the electromagnetic spectrum. These images help predict daily weather patterns, environmental parameters influencing crop cycles such as soil composition, water and mineral levels deeper in the Earth's crust, and may also serve as surveillance sensors meant to monitor activity over hostile regions. A satellite may carry more than one sensor and may acquire images throughout a period of time. Changing weather conditions may interfere with the signal. Images captured in a multi-sensor satellite imaging environment show linear deformations due to the position of the sensors relative to the object. This transformation is often linear in nature and may manifest itself as relative translational, rotational or scaling between images. This provides a good setting to observe different divergence measures as a function of the relative deformation between images.

Figure 17A:
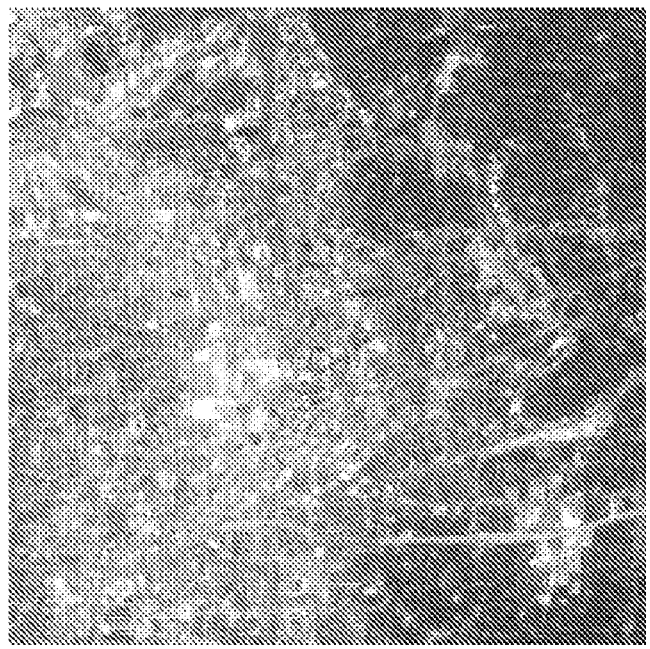
FIG. 17A is a thermal infrared image, $I_1$, of Atlanta, Ga. acquired via satellite.
Figure 17B:
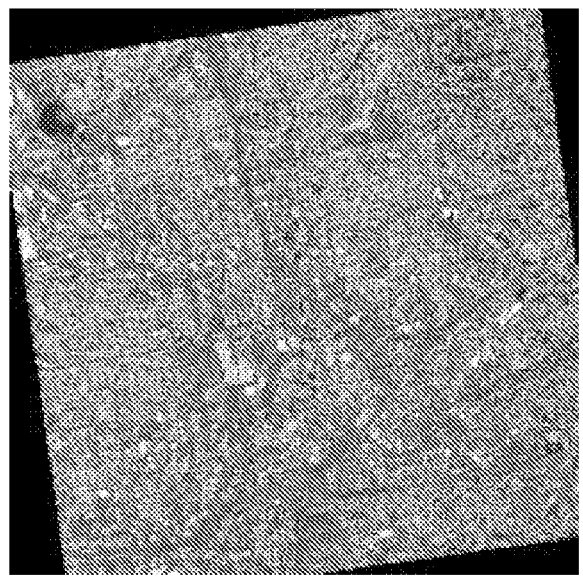
FIG. 17B a visible image, $I_2$, of Atlanta, Ga. acquired via satellite that has been rotated.

Linear rotational deformation was simulated in order to reliably test the image registration algorithms presented above. FIG. 17A is a thermal infrared image, $I_1$, of Atlanta, Ga. and FIG. 17B is a visible image, $I_2$, of Atlanta, Ga. that has been rotated, both acquired as a part of the 'Urban Heat Island' project (Project Atlanta, NASA Marshall Space Flight Center, Huntsville, Ala.) that studies the creation of high heat spots in metropolitan areas across the USA. Pairs of visible light and thermal satellite images were also obtained from NASA's Visible Earth website (NASA Visible Earth internet site, http://visibleearth.nasa.gov/). The variability in imagery arises due to the different specialized satellites used for imaging. These include weather satellites wherein the imagery shows heavy occlusion due to clouds and other atmospheric disturbances. Other satellites focus on urban areas with roads, bridges and high rise buildings. Still other images show entire countries or continents, oceans and large geographic landmarks such as volcanoes and active geologic features. Lastly, images contain different landscapes such as deserts, mountains, and valleys with dense foliage.

Images are rotated through 0° to 32°, with a step size adjusted to allow a finer sampling of the objective function near 0°. The images are projected onto a Meyer wavelet basis, and the coefficients are used as features for registration. A feature sample from an image, I, in the database is represented as tuple consisting of the coefficient vector, and a two dimensional vector identifying the spatial coordinates of the origin of the image region it represents. For example $\{W_{(i,j)}, x_{(i,j)}, y_{(i,j)}\}$ represents the tuple from position $\{i, j\}$ in the image. Now, $$W_{(i,j)} \equiv \{w_{(i,j)}^{Low-Low}, w_{(i,j)}^{Low-High}, w_{(i,j)}^{High-Low}, w_{(i,j)}^{High-High}\},$$

where the superscript identifies the frequency band in the wavelet spectrum. Features from both the images $\{Z_1, Z_2\}$ are pooled together to from a joint sample pool $\{Z_1 \cup Z_2\}$. The MST and k-NNG are individually constructed from this sample pool.

Figure 18:
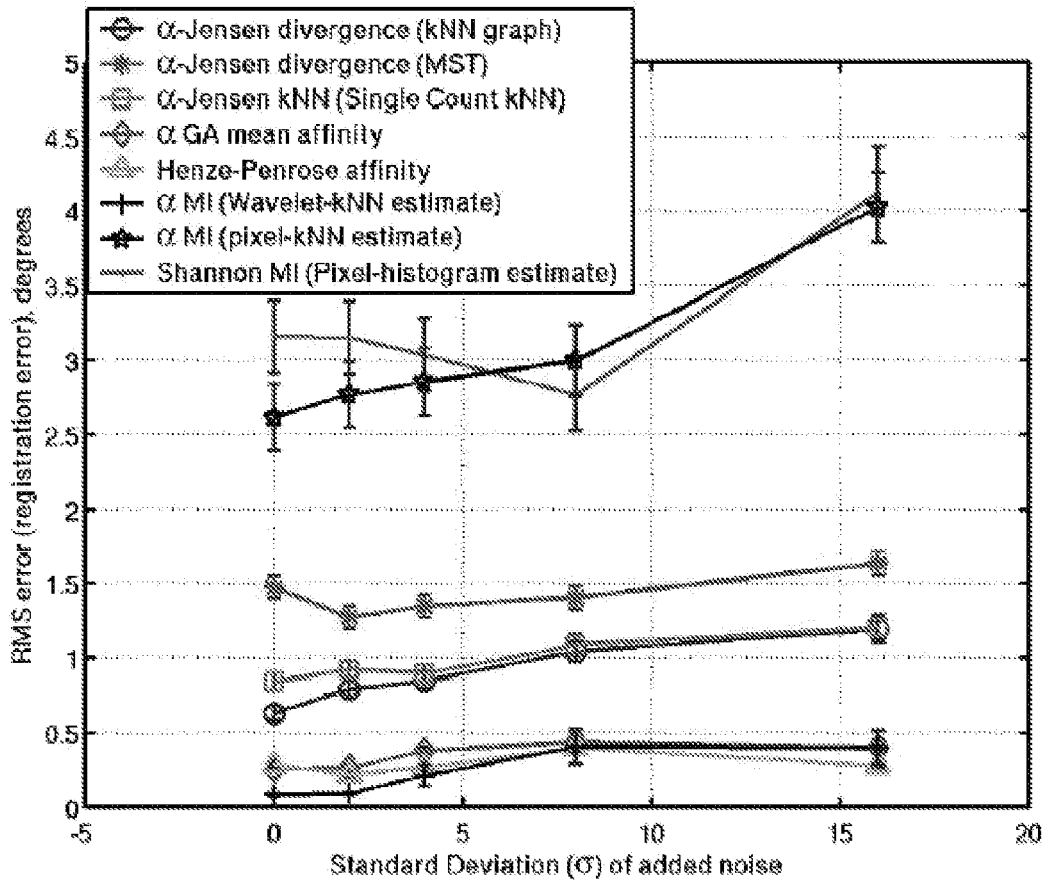
FIG. 18 is a graphical registration of a rotational root mean squared error obtained from rotational registration of multi-sensor satellite imagery (FIGS. 17A and 17B) using six different image similarity/dissimilarity criteria and standard error bars are as indicated. These plots were obtained from Monte Carlo trials consisting of adding independent identically distributed Gaussian distributed noise to the images prior to registration.

FIG. 18 is a graphical registration of a rotational root mean squared error obtained from rotational registration of multi-sensor satellite imagery (FIGS. 17A and 17B) using six different image similarity/dissimilarity criteria and standard error bars are as indicated. These plots were obtained from Monte Carlo trials consisting of adding independent identically distributed Gaussian distributed noise to the images prior to registration.

From FIG. 18, best performance under the presence of noise can be seen through the use of the α-MI estimated using wavelet features and k-NNG. Comparable performances are seen through the use of HP affinity and α-GA divergences, both estimated using wavelet features. Interestingly, the single pixel Shannon MI has the poorest performance which may be attributed to its use of poorly discriminating scalar intensity features. Notice that the α-GA, HP affinity, and α-MI (Wavelet-kNN estimate), all implemented with wavelet features, have significantly lower MSE compared to the other methods.

Figure 19:
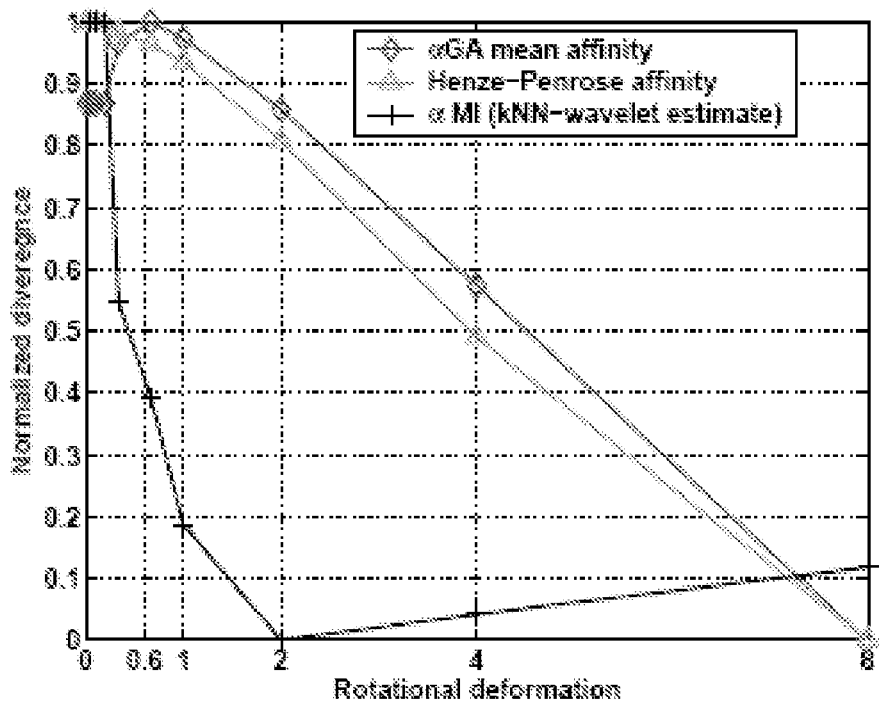
FIG. 19 is a graphical representation of an average affinity and divergence, over all images, in the vicinity of zero rotation error by α-geometric arithmetic mean affinity, α-mutual information based upon k-NNG, and Henze-Penrose affinity.
Figure 20:
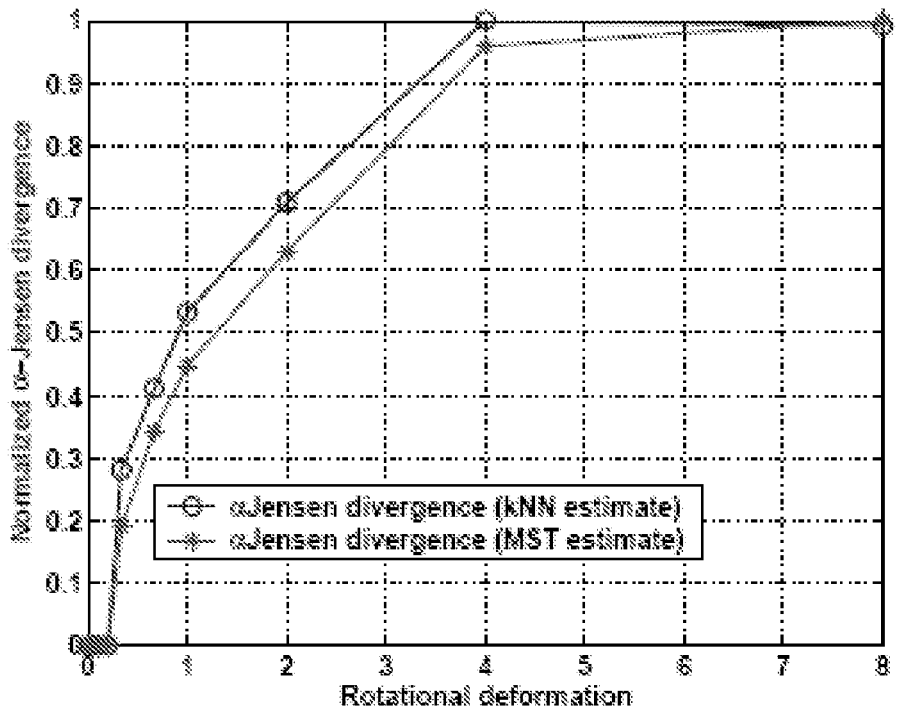
FIG. 20 is a graphical representation of an average affinity and divergence, over all images, in the vicinity of zero rotation error by α-Jensen based upon k-NNG and α-Jensen based upon MST.

Further insight into the performance of the method of the subject invention may be gained by considering the mean objective function over 750 independent trials. FIG. 19 shows the α-MI, HP affinity and the α-GA affinity and FIG. 20 shows the α-Jensen difference divergence calculated using the k-NNG and the MST. The sensitivity and robustness of the dissimilarity measures can be evaluated by observing the divergence function near zero rotational deformation.

The subject invention also contemplates other methods beyond the entropic graphs that may be used for registering a sequence of decorelating images. The analysis of heterogeneous tumor response to therapy including following macro-cellular dynamics, e.g. displacement, growth, stasis, or regression, at the level of a MRI voxel can be quantified by a highly nonlinear registration, i.e. warping, of all high spatial resolution MRI anatomical interval exams. In some cases not only does the morphology of tumor and normal tissues change, but also the intensity of tissues may change due to transient edema or ischemia with only little or no morphological changes. Morphological changes typically lag behind the occurrence of intensity changes. The necessary registration of interval exams could proceed automatically in a pair-wise manner using similarity measures that are relatively independent of tissue scan intensities, e.g. mutual information, normalized mutual information, joint entropy, etc., to optimize the accuracy of the registration. Due to the presence of tumors and the usually rapid temporal morphological evolution of the tumor's morphology, pair-wise registration is important due to the large common, i.e. mutual, information present between adjacent intervals which results from the shortest interval pair having the greatest morphological similarities. The short-range, pair-wise registration is uninformed about longer interval similarities, after several pair-wise registrations the "registered" images at the end of the sequence of acquisitions are not as well registered with the initial image of the sequence due to the accumulation of small registration errors at each interval.

An incremental and ad hoc solution to the latter problem might identify ways of including the long range interval information in the registration, e.g. by defining a "super" interval to be made up of more than one interval set, performing the long range registration, and redistributing the measured error across the short interval registrations that make up the super interval. This latter approach may include the fact that the long range interval registration primarily contains information about low temporal frequency deformations, i.e. structures that change slowly with time, while the short term intervals primarily contain information regarding higher temporal frequency deformations. Estimating such weightings in a meaningful manner to allow the optimal summation of these components is difficult and equally error prone. An alternative and better solution because it includes the appropriate, intrinsic weighting of these components is the simultaneous, joint registration to a common reference of all intervals using mutual information as an objective function, which can be accomplished with the subject invention. Because joint mutual information formed across all interval exams is used to optimize the registration of the temporally distributed data volumes, the relative weighting of short and long range intervals is accomplished automatically, i.e. the longer interval pairs have less mutual information due to decreased morphological similarity, and thus the joint mutual information-based registration is appropriately less sensitive to the long range interval pairings than to short interval pairings.

In the process described above the registration of the temporal data volumes via joint mutual information optimization must occur through methods that support higher degrees of freedom than the typical two dimensional techniques found in current registration literature. Note that the joint mutual information formulation for a pair of, i.e. two images, is currently a 2 dimensional problem for single voxel registration techniques. At a minimum the joint optimization of N intervals will require solution of an N+1 dimensional joint mutual information problem. By computing the warping of all interval exams to a common reference, the dynamics of all tumor voxels are followed over space and time contained in these intervals. The positions can be tracked and the local size changes can be measured where increases imply local cellular proliferation, while decreases imply local cell death. These size changes are quantified by the determinant of the local Jacobian, i.e. the matrix of local spatial derivatives, of the warping. In summary these tools provide methods for quantification of a tumor's heterogeneous response to therapy where the region of interest need be identified, i.e. manually segmented, only once in the reference interval exam.

The subject invention also provides a computer readable recording medium storing an executable control program for executing the methods described above. The computer code for executing the subject invention is set forth in the "Computer Code" compact disc, which is incorporated herein by reference. The "Computer Code" compact disc includes the executable programs as follows,: 1) Program to construct MST using Kruskal algorithm (1mstkruskal.txt), 2) Program to construct MST using Prim algorithm (2mstprim.txt), 3) Program to estimate Henze-Penrose affinity using MST (3hpmst.txt), 4) Program to construct k-NNG using kd tree algorithm (4knngkd.txt), 5) Program to construct estimates of α-MI using k-NNG (5miknng.txt), 6) Program to construct estimates of α-GA mean divergence using k-NNG (6gaknng.txt), and 7) Program to construct estimates of Non-Linear Correlation Coefficient using k-NNG (7nonlinknng.txt).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of determining alignment of decorelating images in high dimensional feature space, said method comprising:
    simultaneously registering a source image of a reference modality to a plurality of target images of a second modality with an algorithm based upon a measure of information affinity present in both of the source and target images to create a registered image;
    extracting a plurality of feature vectors from the registered image for each of the source and target images;
    plotting a distribution of the feature vectors on an entropic graph;
    determining edge lengths between the feature vectors from the entropic graph; and
    determining a similarity measure of one of an α-divergence estimate or an α-affinity estimate based upon these edge lengths to indicate whether the source and target images are sufficiently registered.

2. A method as set forth in claim 1 wherein the entropic graph is further defined as a minimal graph spanning the feature vectors that minimizes a function of the total edge length of the minimal graph and that approximates the α-affinity or α-divergence of the distribution of the feature vectors.

3. A method as set forth in claim 1 wherein the entropic graph is further defined as based upon one of a minimum spanning tree (MST) or a k-nearest neighbor graph (k-NNG), a Steiner tree, a Delaunay triangulation, or a traveling salesman problem (TSP).

4. A method as set forth in claim 1 further comprising the step of re-deforming the source image into the target images with a different algorithm to shorten the edge lengths from the entropic graph thereby improving the similarity measure therebetween.

5. A method as set forth in claim 1 wherein the reference modality is further defined as different than the second modality.

6. A method as set forth in claim 1 wherein each of the feature vectors represent at least two feature dimensions.

7. A method as set forth in claim 1 wherein each of the feature vectors represent more than two feature dimensions.

8. A method as set forth in claim 1 wherein the step of determining the similarity measure is further defined as utilizing at least one of an α-mutual information (α-MI), an α-geometric-arithmetic (α-GA) divergence, and a Henze-Penrose (HP) divergence.

9. A method as set forth in claim 8 wherein the α-MI is further defined by the general formula:

$$\alpha MI = D_\alpha(f\|g) = \frac{1}{\alpha-1}\log\int f^\alpha(x,y)f^{1-\alpha}(x)f^{1-\alpha}(y)dxdy$$

wherein f and g are densities,
$\alpha \in (0,1)^1$,
f(x,y) is a joint density, and
g(x,y) is a product of marginals f(x)f(y).

10. A method as set forth in claim 8 wherein the α-GA divergence is further defined by the general formula:

$$\alpha D_{GA}(f,g) =$$

$$D_\alpha(pf+qg\|f^p g^q) = \frac{1}{\alpha-1}\log\int (pf(z)+qg(z))^\alpha (f^p(z)g^q(z))^{1-\alpha}dz$$

wherein f and g are densities,
$\alpha \in (0,1)^1$,
p and q=1−p are weights;
$p \in [0,1]$,
f(x,y) is a joint density, and
g(x,y) is a product of marginals f(x)f(y).

11. A method as set forth in claim 8 wherein the HP divergence is further defined by the general formula:

$$D_{HP}(f\|g) = \int \frac{p^2 f^2(z) + q^2 g^2(z)}{pf(z) + qg(z)} dz$$

wherein f and g are densities,
p and q=1−p are weights;
$p \in [0,1]$,
f(x,y) is a joint density, and
g(x,y) is a product of marginals f(x)f(y).

12. A method of determining alignment of decorelating images in high dimensional feature space, said method comprising:
simultaneously registering more than two images comprising at least a source image of a reference modality to target images of a second modality with an algorithm based upon a measure of mutual information present in both of the source and target images to create a registered image;
extracting a plurality of feature vectors from the registered image for each of the source and target images;
determining edge lengths between proximal feature vectors from an entropic graph; and
determining a similarity measure of one of an α-divergence estimate or an α-affinity estimate based upon these edge lengths with at least one of an α-mutual information (α-MI), an α-geometric-arithmetic (α-GA) divergence, and a Henze-Penrose (HP) divergence.

13. A method as set forth in claim 12 wherein the α-MI is further defined by the general formula:

$$\alpha MI = D_\alpha(f\|g) = \frac{1}{\alpha-1} \log \int f^\alpha(x,y) f^{1-\alpha}(x) f^{1-\alpha}(y) dx dy$$

wherein f and g are densities,
$\alpha \in (0,1)^1$,
f(x,y) is a joint density, and
g(x,y) is a product of marginals f(x)f(y).

14. A method as set forth in claim 12 wherein the α-GA divergence is further defined by the general formula:

$$\alpha D_{GA}(f,g) =$$
$$D_\alpha(pf + qg\|f^p g^q) = \frac{1}{\alpha-1}\log\int (pf(z)+qg(z))^\alpha (f^p(z)g^q(z))^{1-\alpha} dz$$

wherein f and g are densities,
$\alpha \in (0,1)^1$,
p and q=1−p are weights;
$p \in [0,1]$,
f(x,y) is a joint density, and
g(x,y) is a product of marginals f(x)f(y).

15. A method as set forth in claim 12 wherein the HP divergence is further defined by the general formula:

$$D_{HP}(f\|g) = \int \frac{p^2 f^2(z) + q^2 g^2(z)}{pf(z) + qg(z)} dz$$

wherein f and g are densities,
p and q=1−p are weights;
$p \in [0,1]$,
f(x,y) is a joint density, and
g(x,y) is a product of marginals f(x)f(y).

16. A method as set forth in claim 12 wherein the entropic graph is further defined as based upon one of a minimum spanning tree (MST) or a k-nearest neighbor graph (k-NNG).

17. A computer readable recording medium storing an executable control program for executing a method of determining alignment of decorelating images in high dimensional feature space, said method comprising:
simultaneously registering more than two images with an algorithm based upon a measure of information affinity present in the images to create a registered image;
extracting a plurality of feature vectors from the registered image for each of the source and target images;
determining edge lengths between proximal feature vectors from an entropic graph; and
determining a similarity measure of one of an α-divergence estimate or an α-affinity estimate based upon these edge lengths to indicate whether the source and target images are sufficiently registered.

18. A method as set forth in claim 17 wherein the entropic graph is further defined as based upon one of a minimum spanning tree (MST), a k-nearest neighbor graph (k-NNG), a Steiner tree, a Delaunay triangulation, or a traveling salesman problem (TSP).

19. A method as set forth in claim 17 wherein the step of determining the similarity measure is further defined as utilizing at least one of an α-mutual information (α-MI), an α-geometric-arithmetic (α-GA) divergence, and a Henze-Penrose (HP) divergence.

* * * * *

UNITED STATES PATENT AND TRADEMARK OFFICE
CERTIFICATE OF CORRECTION

PATENT NO. : 7,653,264 B2
APPLICATION NO. : 11/276537
DATED : January 26, 2010
INVENTOR(S) : Hero et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Twenty-third Day of November, 2010

David J. Kappos
*Director of the United States Patent and Trademark Office*